United States Patent
Hannah et al.

(10) Patent No.: US 8,578,984 B2
(45) Date of Patent: Nov. 12, 2013

(54) NON-MOTORIZED VEHICLE WHEEL REPLACEMENT TREADS AND METHODS

(71) Applicant: Gatekeeper Systems, Inc., Irvine, CA (US)

(72) Inventors: Stephen E. Hannah, Placentia, CA (US); John C. McKay, Placentia, CA (US)

(73) Assignee: Gatekeeper Systems, Inc., Irvine, CA (US)

( * ) Notice: Subject to any disclaimer, the term of this patent is extended or adjusted under 35 U.S.C. 154(b) by 0 days.

(21) Appl. No.: 13/623,676

(22) Filed: Sep. 20, 2012

(65) Prior Publication Data

US 2013/0076104 A1    Mar. 28, 2013

Related U.S. Application Data

(60) Provisional application No. 61/537,715, filed on Sep. 22, 2011, provisional application No. 61/692,148, filed on Aug. 22, 2012.

(51) Int. Cl.
| | |
|---|---|
| *B60B 7/06* | (2006.01) |
| *B60B 33/04* | (2006.01) |
| *B60B 23/10* | (2006.01) |
| *B21D 53/26* | (2006.01) |

(52) U.S. Cl.
USPC ..... 152/176; 152/379.3; 152/385; 301/108.1; 301/37.102; 301/35.51; 29/894.31; 16/45

(58) Field of Classification Search
USPC .......... 152/176, 185.1, 323, 379.3, 380, 385, 152/DIG. 18; 301/5.1, 5.306, 5.309, 35.51, 301/37.101, 37.102, 37.371, 108.1, 108.4; 16/45; 29/894.3
See application file for complete search history.

(56) References Cited

U.S. PATENT DOCUMENTS

| | | | |
|---|---|---|---|
| 1,686,301 A | | 10/1928 | Wagenhorst |
| 2,083,766 A | * | 6/1937 | Wittkopp .................... 152/379.3 |
| 4,114,952 A | * | 9/1978 | Kimmell ......................... 301/5.7 |
| 4,923,252 A | * | 5/1990 | Plamper et al. ........... 301/64.704 |
| 5,503,466 A | | 4/1996 | Lew |
| 6,286,572 B1 | * | 9/2001 | Chen ............................... 152/84 |
| 6,298,891 B1 | | 10/2001 | Harris |
| 6,467,519 B1 | | 10/2002 | Owen |
| 7,316,252 B1 | | 1/2008 | Heard |

(Continued)

FOREIGN PATENT DOCUMENTS

| | | |
|---|---|---|
| JP | 2010-132010 | 6/2010 |
| WO | WO 2013-043916 | 3/2013 |

OTHER PUBLICATIONS

International Search Report and Written Opinion in corresponding International Application No. PCT/US2012/056406, mailed Mar. 21, 2013, 10 pages.

*Primary Examiner* — Kip T Kotter
(74) *Attorney, Agent, or Firm* — Knobbe, Martens, Olson & Bear, LLP

(57) ABSTRACT

A wheel for a non-motorized vehicle (e.g., a shopping cart) can include a housing assembly and a tread assembly. The housing assembly can be configured to sealingly house electronics or other components. The tread assembly can removably mate with the housing assembly such that the electronics or other components remain closed and/or sealed within the housing assembly when the tread assembly is mated or unmated with the housing assembly.

24 Claims, 18 Drawing Sheets

(56) References Cited

U.S. PATENT DOCUMENTS

| | | |
|---|---|---|
| 7,334,617 B2 | 2/2008 | Hill, III et al. |
| 7,878,600 B2 | 2/2011 | Krantz |
| 8,292,018 B2 * | 10/2012 | Huang .................. 180/220 |
| 2005/0257871 A1 * | 11/2005 | Hill et al. ................ 152/323 |
| 2008/0143070 A1 | 6/2008 | Sonnendorfer et al. |
| 2008/0179940 A1 | 7/2008 | Hill et al. |
| 2010/0052412 A1 | 3/2010 | Morris |

* cited by examiner

NON-MOTORIZED VEHICLE WHEEL REPLACEMENT TREADS AND METHODS

RELATED APPLICATIONS

This application claims the priority benefit under 35 U.S.C. §119(e) of U.S. Provisional Patent Application No. 61/537,715, filed Sep. 22, 2011, titled "WHEEL REPLACEMENT TREADS AND METHODS," and U.S. Provisional Patent Application No. 61/692,148, filed Aug. 22, 2012, titled "WHEEL REPLACEMENT TREADS AND METHODS," the entirety of each of which is incorporated by reference herein.

BACKGROUND

1. Field

The present disclosure relates to replaceable treads for wheels and wheels having replaceable treads usable with non-motorized vehicles.

2. Description of the Related Art

Non-motorized wheeled vehicles, such as human-propelled carts (e.g., shopping carts), can include two or more wheels. Vehicle wheels incur wear as a result of use or damage. For example, prolonged use of the wheel can cause a tread of the wheel to become worn down. Accordingly, the wheel may need to be replaced.

SUMMARY

Various embodiments are directed to wheels and wheel treads for non-motorized vehicles (e.g., human-propelled carts). Replacement of vehicle wheels can incur substantial expense, particularly in implementations in which the vehicle wheel includes expensive electronic components (e.g., theft prevention electronics in a shopping cart wheel). Accordingly, in certain embodiments, rather than replacing the entire wheel, the tread of the wheel can be replaced. In certain such embodiments, the tread can be configured to be axially removed and installed on the wheel.

Certain wheels require complete or substantially complete removal and/or disassembly of the wheel from the wheeled vehicle in order to replace the treads of the wheels. Furthermore, some wheels may require the disassembly of a sealed portion of the wheel in order to replace the tread. For example, some embodiments may require the opening of a chamber (e.g., in a central portion of the wheel) in order to replace the tread. However, in certain instances, it can be desirable to avoid disassembling certain portions of the wheel to replace the tread. For example, it can be beneficial to avoid opening a sealed chamber containing electrical components disposed in the wheel.

In some embodiments, a wheel assembly includes a serviceable tread assembly that is capable of being installed and attached to a non-serviceable housing assembly. As used herein, the term "serviceable" has its ordinary meaning and includes, without limitation, the characteristic of being intended to be replaced during the course of use of the item. As used herein, the term "non-serviceable" has its ordinary meaning and includes, without limitation, the characteristic of not intended to be replaced during the intended course of use of the item. For example, certain components of the wheel may be sealed (e.g., to inhibit contamination) and may be non-serviceable. Non-serviceable also includes situations where a component is not intended to be serviced by an end-user but which may be serviced by a factory-authorized technician or by the manufacturer. In certain instances, the wheel assembly is configured for use on a non-motorized vehicle. For example, the wheel assembly can be configured for use on a locking shopping cart wheel. In some embodiments, the tread assembly attaches to the housing assembly with one or more fastening devices (such as screws, bolts, nails, or otherwise) and/or locking features. In certain configurations, the fastening devices and/or locking features are arranged around the circumference of the tread assembly and/or the housing assembly.

In some embodiments, the tread assembly includes a tread and a frame (e.g., support, backbone, lattice, skeleton, spine, or other structural portion). In certain instances, the frame provides support and/or reinforcement for the tread. For example, in certain variants, the frame can be positioned radially inward of the tread and can be configured to bear force (e.g., compressive force) that is applied to the tread. In some implementations, the frame is configured to shape the tread (e.g., a generally cylindrical shape). In certain embodiments, the tread assembly couples with the housing assembly, which can include a hub and a cover. In some embodiments, installation of the tread assembly is facilitated by the structure of the hub and cover components. For example, the hub and cover components can be configured to allow the tread assembly to be slid onto the hub.

In certain embodiments, the tread assembly is held in position on the housing assembly by one or more fastening devices and/or locking features. In some cases, the fastening devices and/or locking features are integral with the tread assembly and/or the housing assembly. In certain embodiments, the fastening devices and/or locking features are axially arranged around the inside and/or outside surfaces of the tread assembly and correspond to mating features similarly arranged around the outer circumferential surfaces of the wheel assembly (e.g., the hub). As used herein, the term "axial," or derivations thereof, has its ordinary meaning and refers to, without limitation, a direction that is substantially perpendicular to a plane in which the wheel rotates. The axial direction may be substantially parallel to or substantially collinear with a rotation axis of the wheel (e.g., within ten to twenty degrees of the rotation axis). In some cases, the tread assembly is maintained on the housing assembly by one or more fasteners.

In some embodiments, the tread assembly is configured to be removed from the housing assembly. In certain such cases, the tread assembly can be removed without the need to disassemble the housing assembly (e.g., by separating the hub and the cover). Such a configuration can, for example, facilitate easy replacement of the tread assembly (e.g., due to wear or damage) while preserving the integrity of the housing assembly. For example, a tread assembly that can be replaced without the need to open the housing assembly can maintain the efficiency of the seals on embodiments of the housing assembly that include such seals to protect components (e.g., electronics) located inside the housing assembly. In certain instances, removal of the worn or damaged tread is accomplished by the removal or disengagement of the fastening devices and/or locking features that secure the tread to the housing assembly. In some cases, the removal also includes axially sliding the tread off the mating wheel hub exterior geometry. A new tread assembly can be installed by reversing this procedure.

A wheel for a human-propelled cart can comprise a housing assembly having a hub and a cover. The hub can have an inner cavity and can comprise a frame engaging surface having a first mating feature, the inner cavity configured to receive an electrical component and the cover configured to be sealed with the hub, thereby inhibiting access into the inner cavity. In some embodiments, the wheel includes a tread assembly configured to axially receive a portion of the housing assembly, the tread assembly comprising a frame and a tread. The frame can have a tread engaging surface and a hub engaging surface, the hub engaging surface having a second mating feature and being configured to releasably couple with the frame engaging surface of the hub. The tread can be disposed radially outward of the frame and can be configured to engage a surface on which the wheel is configured to roll. The wheel can include a fastener configured to engage the first mating feature and the second mating feature. According to some variants, the tread assembly is configured to removably couple with the housing assembly such that the tread assembly can be axially separated from the housing assembly without unsealing the cover and the hub, thereby facilitating repair or replacement of the tread assembly while maintaining the seal of the cover and the hub. In some embodiments, when the hub engaging surface of the frame is coupled with the frame engaging surface of the hub, the first mating feature and the second mating feature are circumferentially aligned such that the fastener can axially engage the first mating feature and the second mating feature.

In some embodiments, at least one of the first mating feature and the second mating feature comprises a radially outwardly-extending flange. The tread assembly can include a frame alignment feature comprising a first tread recess configured to receive the first mating feature. The housing assembly may include a hub alignment feature comprising a first housing recess configured to receive the second mating feature. In some embodiments, the wheel is configured to rotate around a rotation axis, and the hub is configured to be rotated relative to the frame about the rotation axis of the wheel. The frame alignment feature can include a second tread recess oriented substantially perpendicular to and extending generally circumferentially from the first tread recess, the second tread recess being configured to receive the first mating feature when the hub is rotated relative to the frame. The frame alignment feature can include a third tread recess extending in a direction generally axially away from the second mating feature, the third tread recess configured to receive the first mating feature when the hub is rotated relative to the frame such that the first mating feature is generally aligned with the third tread recess. In some embodiments, the hub alignment feature includes a second housing recess generally perpendicular to and extending generally tangentially from the first housing recess, the second housing recess configured to receive the second mating feature when the hub is rotated relative to the frame. The hub alignment feature includes a third housing recess extending in a direction generally axially away from the first mating feature, the third housing recess configured to receive the second mating feature when the hub is rotated relative to the frame such that the second mating feature is generally aligned with the third housing recess.

In some embodiments, the tread assembly comprises a first rotational axis and the housing assembly comprises a second rotational axis, the first rotational axis and the second rotational axis being generally collinear when the housing assembly and tread assembly are coupled. The tread can have a tread width, the first mating feature and the second mating feature each can have an axial width that is less than the tread width, and the sum of the axial widths of the first mating feature and the second mating feature can be about equal to the tread width. In some embodiments, the human-propelled cart is a shopping cart.

A method of assembling a shopping cart wheel can comprise forming a housing assembly. Forming the housing assembly can include providing a hub having a central cavity, the hub comprising a first mating feature, axially joining a cover with the hub, the cover configured to form a seal between the cover and the hub, thereby inhibiting access by contaminants into the cavity, forming a tread assembly, wherein forming the tread assembly comprises, providing an annular frame comprising an inner surface and outer surface, the inner surface and the outer surface each comprising recesses, the inner surface further comprising a second mating feature, disposing a tread around at least the outer surface of the frame, and engaging the tread with the recesses on the inner surface and the outer surface of the frame, thereby securing the tread with the frame. In some embodiments, the method of assembling a shopping cart wheel includes aligning the first mating feature of the hub with the second mating feature of the frame, receiving the housing assembly into the tread assembly, and securing the housing assembly with the tread assembly.

In some embodiments, securing the housing assembly with the tread assembly comprises positioning the first mating feature in a first recess of the frame, wherein the first mating feature comprises a radially outwardly extending flange, positioning the second mating feature in a second recess of the hub, wherein the second mating feature comprises a radially inwardly extending flange, and axially inserting a fastener through the first mating feature and the second mating feature. In some embodiments, the method of assembling a shopping cart wheel further comprises rotating the housing assembly and the tread assembly relative to each other after the housing assembly has been received into the tread assembly. The method of assembling a shopping cart wheel can further comprise axially spacing the first mating feature apart from the second mating feature.

A method of repairing a wheel of a shopping cart, the wheel comprising a housing assembly and a tread assembly coupled with a plurality of fasteners located generally around an outer circumferential region of the wheel, the housing assembly coupled with the shopping cart via a caster assembly, the housing assembly comprising a central sealed chamber that includes an electrical component, can comprise removing the wheel from the caster assembly. In some embodiments the method of repairing a wheel of a shopping cart includes loosening the fasteners such that the housing assembly and the tread assembly can be separated, separating the tread axially from the housing assembly without opening the central sealed chamber of the housing assembly, aligning first flanges of a replacement tread assembly with first recesses of the housing assembly, aligning second recesses of the replacement tread assembly with second flanges of the housing assembly, axially sliding the replacement tread assembly onto the housing assembly, securing the fasteners such that the fasteners couple the replacement tread assembly and the housing assembly, and coupling the housing with the caster assembly.

In some embodiments, loosening the fasteners comprises rotating the fasteners. The method of repairing a wheel of a shopping cart can further comprise rotating the tread assembly relative to the housing assembly after the replacement tread assembly has been axially slid onto the housing assembly. In some embodiments, the method of repairing a wheel of a shopping cart further comprising radially engaging the first flanges of a replacement tread assembly with the first recesses of the housing assembly, and radially engaging the second recesses of the replacement tread assembly with the second flanges of the housing assembly, thereby providing areas of radial interference between the housing assembly and the tread assembly.

DETAILED DESCRIPTION

Non-motorized wheeled vehicles are used in a variety of environments including retail environments (e.g., shopping carts), manufacturing or warehouse environments (e.g., merchandise or industrial carts), travel environments (e.g., luggage or baggage carts at an airport or bus station), medical environments (e.g., hospital carts, medical device carts, wheelchairs, baby strollers), and so forth. Non-motorized vehicles are typically human-propelled, e.g., by a human pushing or pulling the vehicle. The present disclosure describes examples of wheels, treads, and methods for assembling wheels or replacing treads that are usable with non-motorized wheeled vehicles. Many of the examples described herein are in the context of wheels for shopping carts; however, this is intended for facilitating understanding and is not a limitation.

Figure 1:
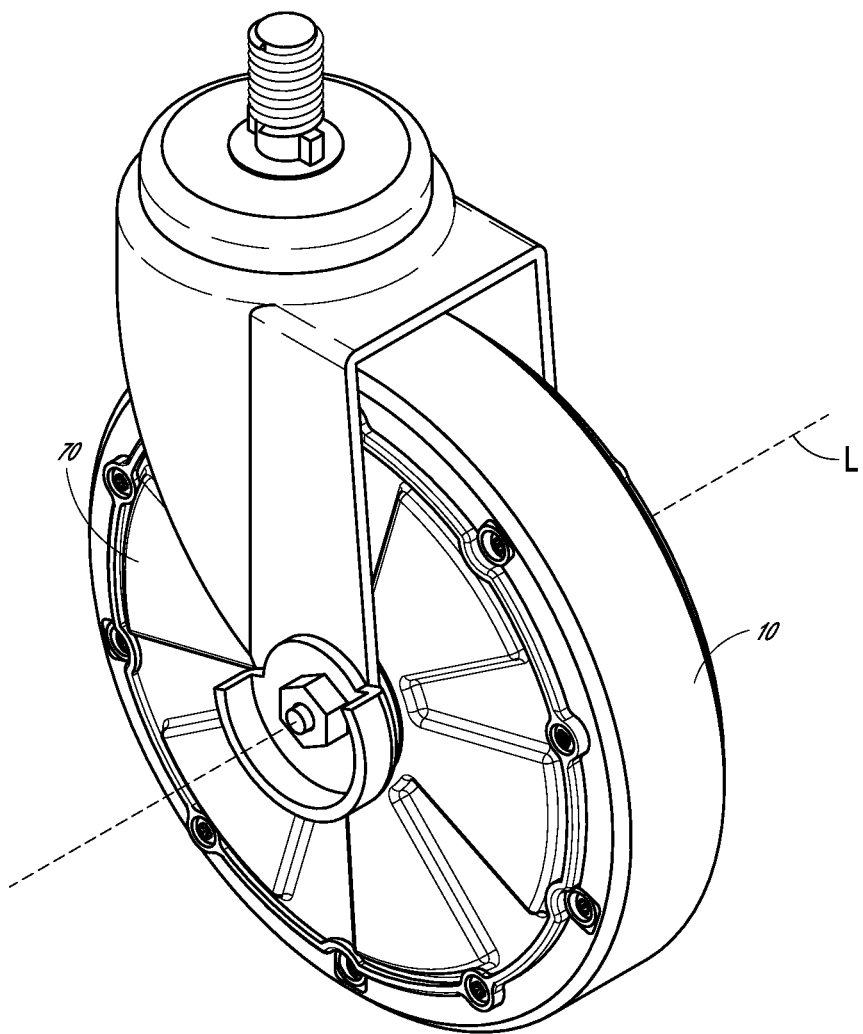
FIG. 1 illustrates a perspective view of an example of a wheel assembly for a cart, including examples of a tread assembly and a housing assembly.

With reference to FIG. 1, in some embodiments, a wheel assembly can include a tread assembly 10 and a housing assembly 70. The tread assembly 10 can be configured to mount or otherwise be received at least partly on the housing assembly 70. The tread assembly 10 can be configured to protect and/or space the housing assembly 10 from a surface on which the wheel assembly rolls. For example, the tread assembly 10 can protect the housing assembly 70 from abrasion due to contact with the surface.

Figure 2:
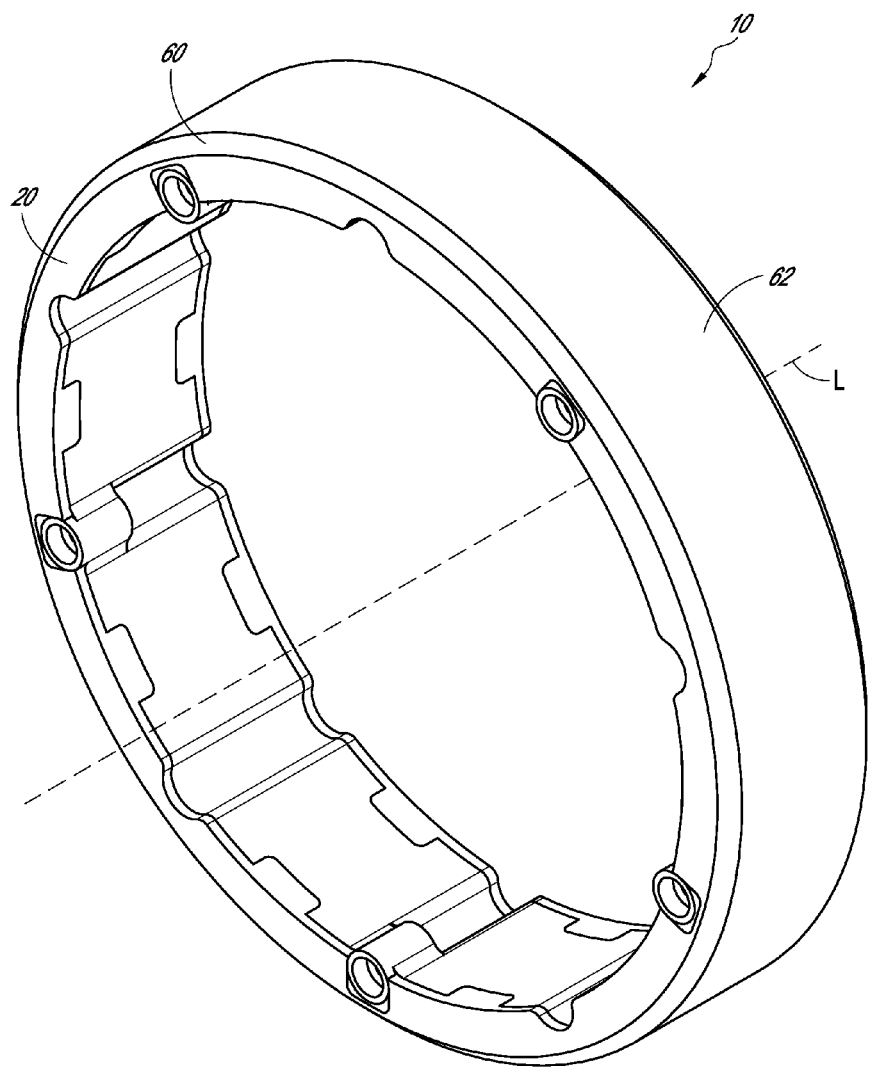
FIG. 2 illustrates a front perspective view of the tread assembly of FIG. 1.

With regard to FIGS. 1-5, an embodiment of a tread assembly 10 is illustrated. In some embodiments, the tread assembly 10 includes a frame 20 and a tread 60. In some embodiments, the frame 20 is generally rigid. In some cases, the frame 20 is made of metal (e.g., steel or aluminum) or a polymer (e.g., nylon). The frame 20 and/or tread 60 can include a rotational centerline. In some embodiments, as illustrated in FIG. 2, the rotational centerline L of the frame 20 is collinear with the rotational centerline of the tread 60 when the frame 20 is mated with the tread 60.

Figure 3:
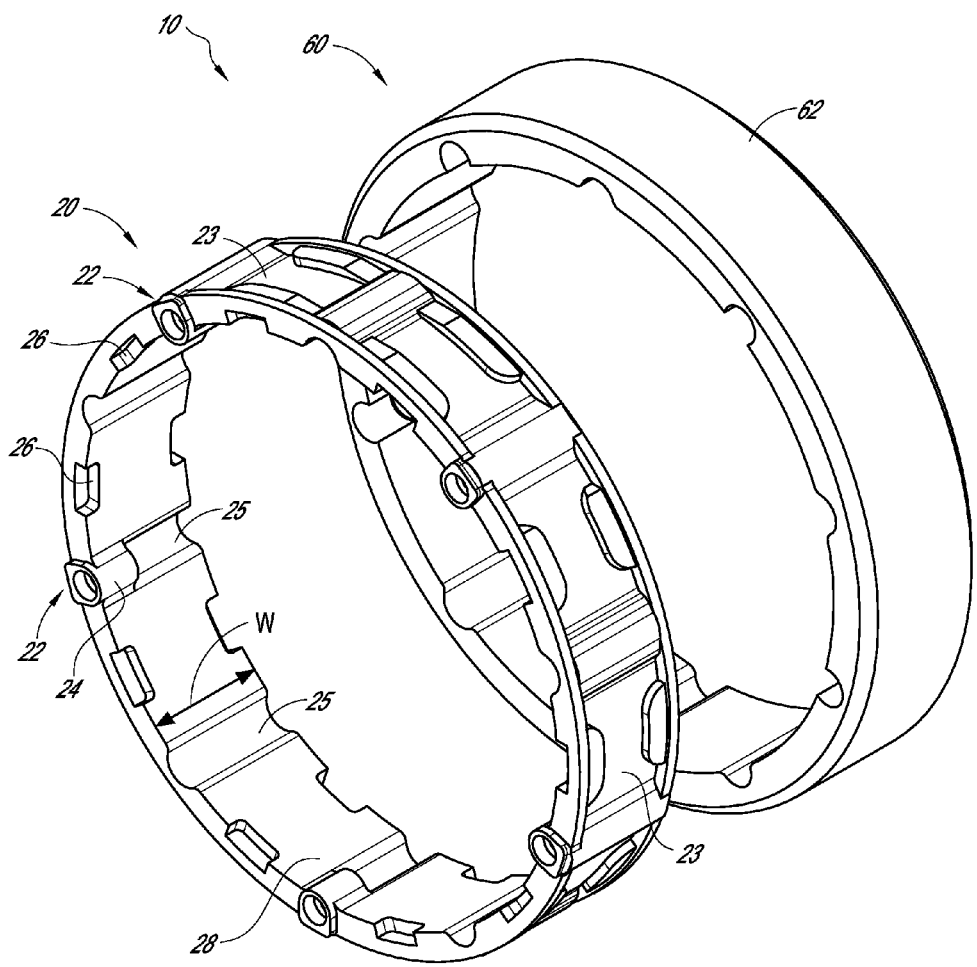
FIG. 3 illustrates an exploded view of the tread assembly of FIG. 1, including a tread and a frame.

As shown in FIG. 3, the frame 20 can be configured to engage with the tread 60. The frame 20 can have one or more recessed features 23. For example, in the embodiment illustrated, the frame 20 can include recessed features 23 that are arranged in a radial pattern around an outer circumference of the frame 20. As will be discussed in further detail below, the recessed features 23 can engage with corresponding features of the tread, thereby securing the frame 20 and the tread 60.

Figure 4:
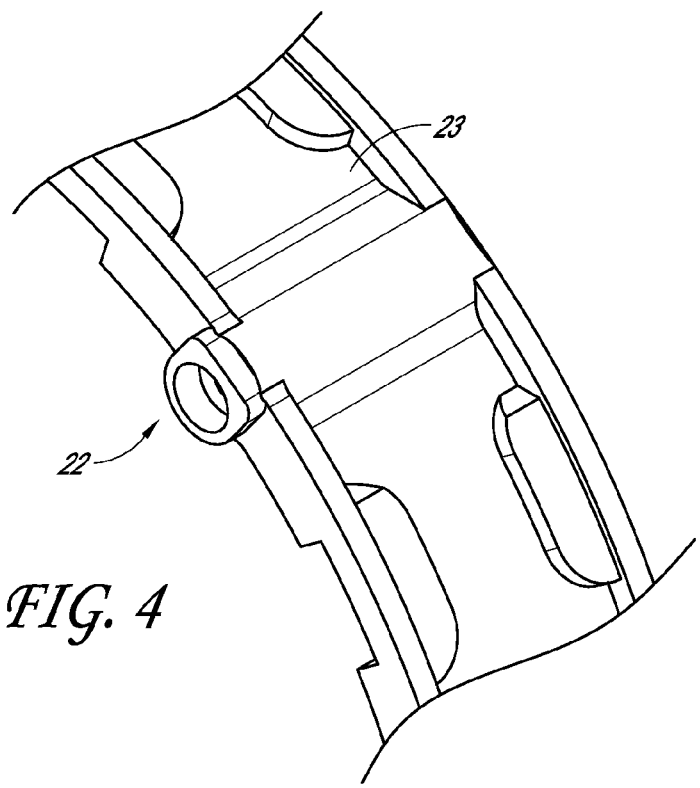
FIG. 4 illustrates a close-up view of a portion of the frame of FIG. 3.
Figure 5:
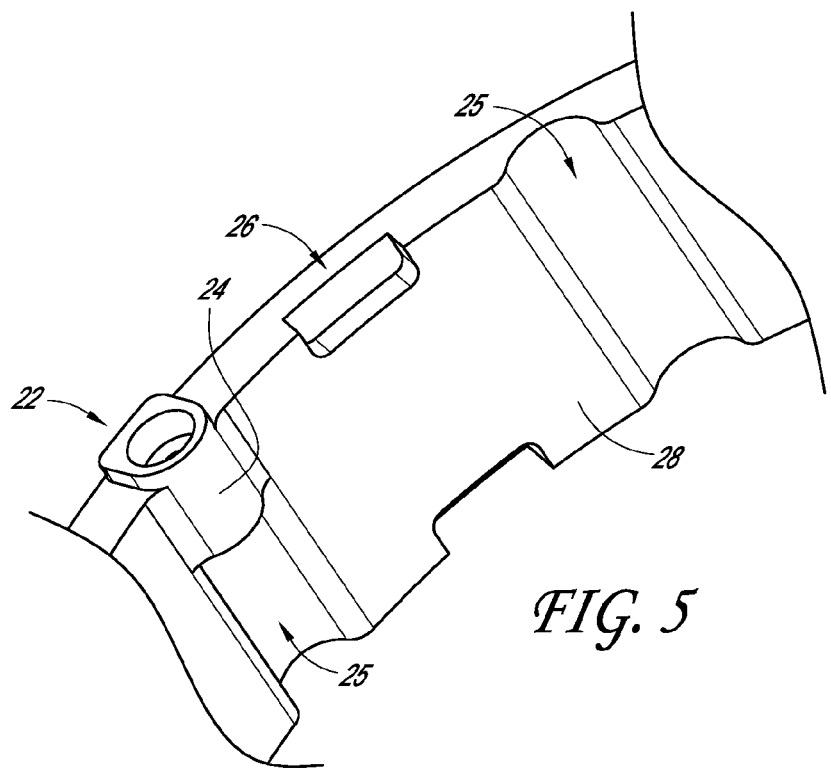
FIG. 5 illustrates another close-up view of a portion of the frame of FIG. 3.
Figure 6:
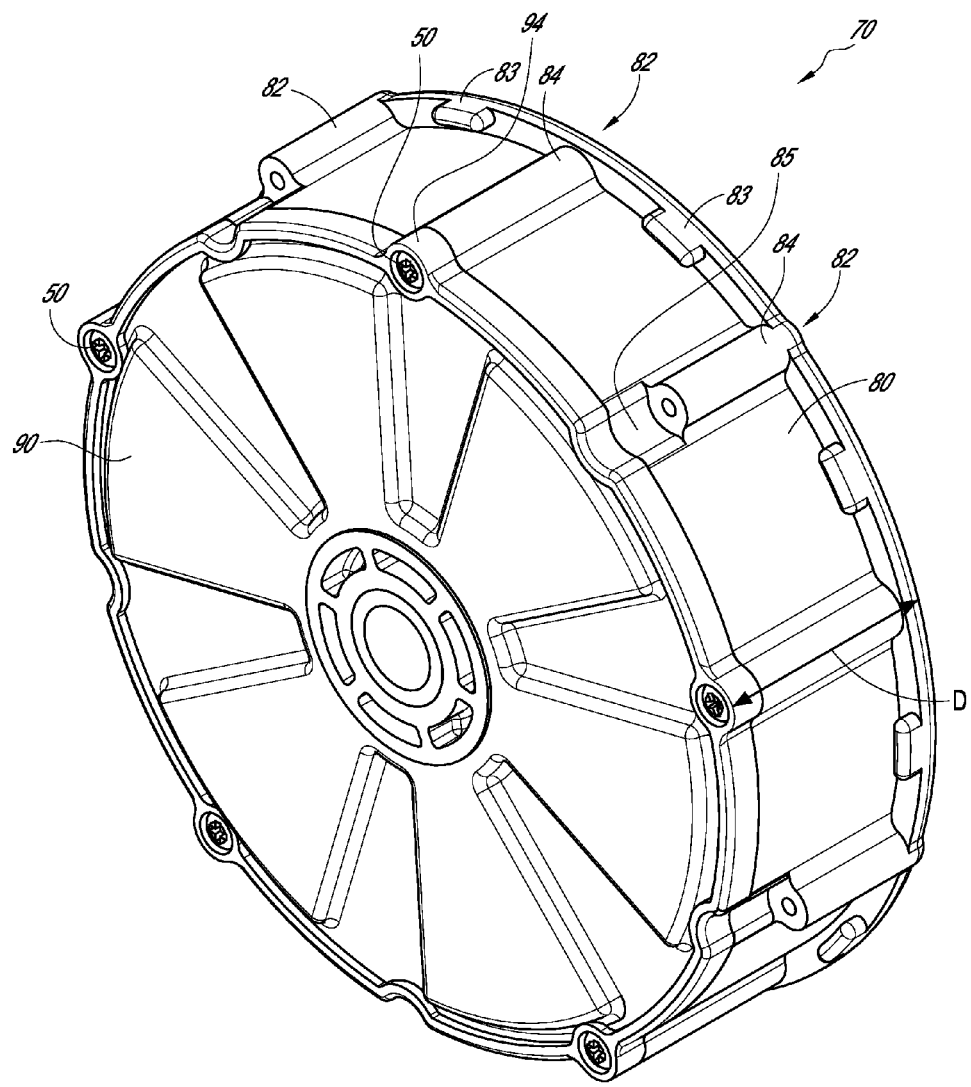
FIG. 6 illustrates an embodiment of the housing assembly of FIG. 1, including a hub and a cover.
Figure 7:
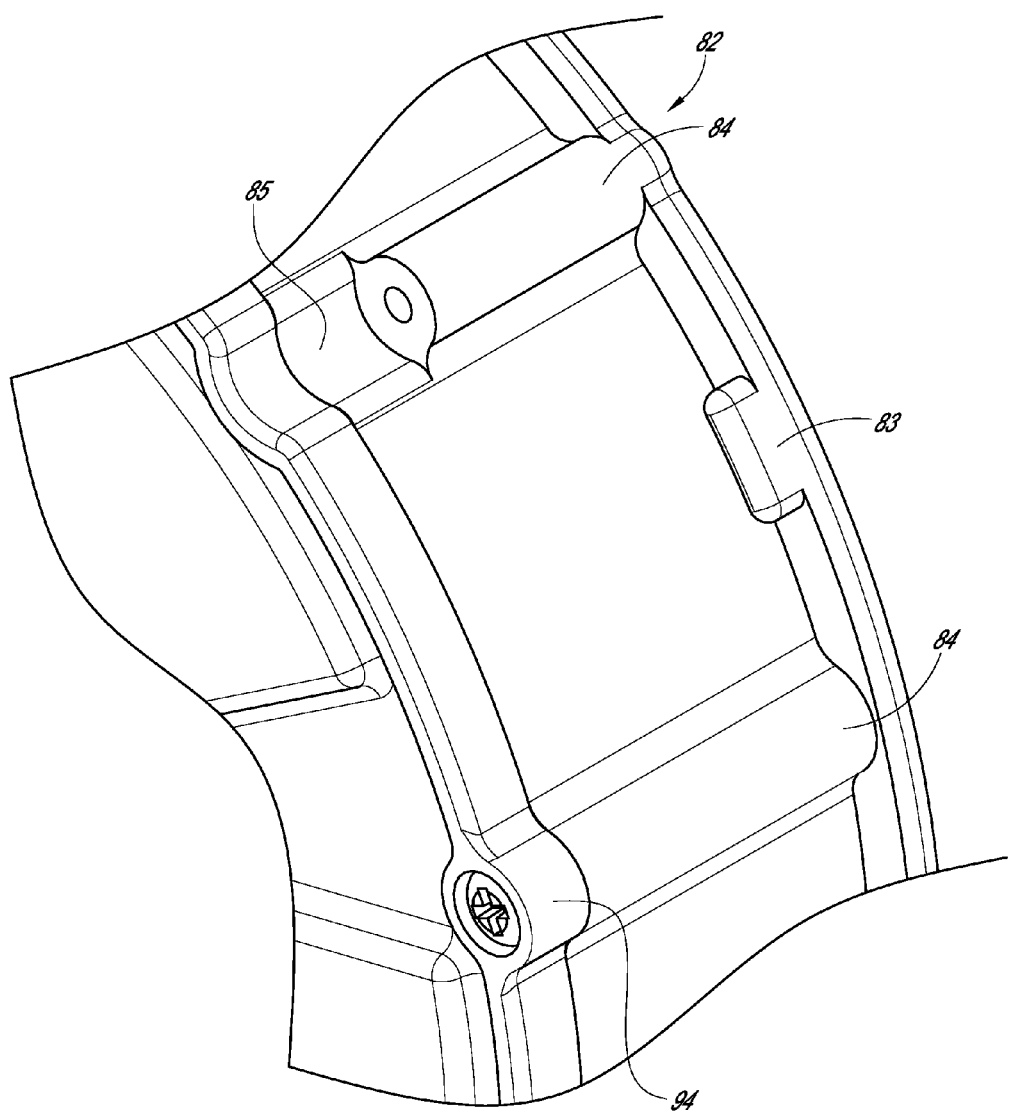
FIG. 7 illustrates a close-up view of a portion of the housing assembly of FIG. 6.
Figure 8:
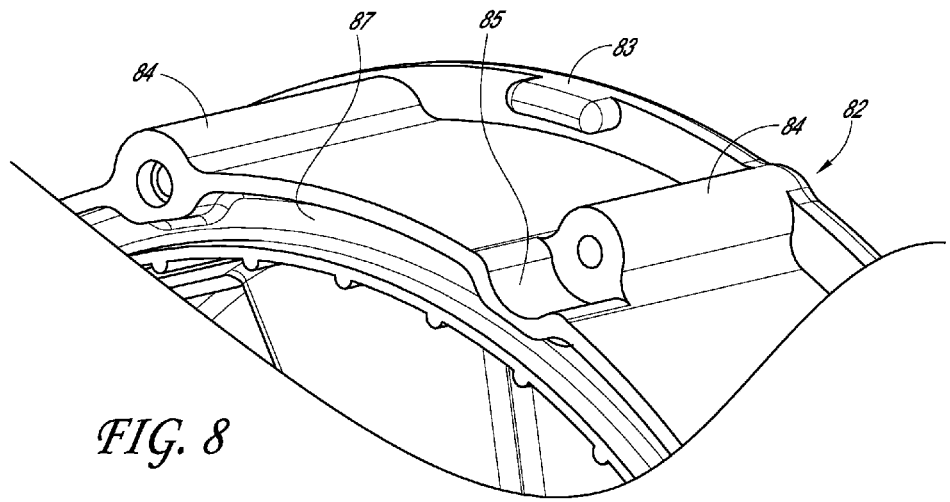
FIG. 8 illustrates a close-up view of a portion of an embodiment of the hub of FIG. 6.

According to some variants, the frame 20 includes a hub-engaging surface 28 located on the radially-inward surface of the frame 20. The frame 20 can include first mating features 22. In some embodiments, the first mating features 22 are located on the hub-engaging surface 28. In certain variants, such as is shown in FIGS. 3 and 4, the first mating features 22 can be one or more radially inwardly-extending flanges 24. In some embodiments, first mating features 22 are configured to allow for the insertion of a corresponding number of fasteners, such as one fastener per first mating feature 22. In the illustrated embodiment, the first mating features 22 are generally equally spaced in a radial pattern around an inner periphery of the frame 20. However, other configurations are contemplated and are included in this disclosure.

In some embodiments, the frame 20 includes indentations 25. In certain instances, the indentations 25 are arranged in a radial pattern around the inner circumference of the frame 20. One or more of the indentations 25 can span the axial (e.g., parallel to the rotational centerline of the frame) width W of the hub-engaging surface 28. In some embodiments, one or more of the indentations 25 are located axially-adjacent to the radially inwardly-extending flanges 24. In such embodiments, the first mating features 22 can comprise a radially inwardly-extending flange 24 and an indentation 25. The radially inwardly-extending flange 24 and corresponding indentation 25 can each have an axial width that is less than the axial width W of the hub-engaging surface 28.

The tread 60, or parts thereof, can be made of most any material, such as rubber, plastic, wood, metal, or otherwise. For example, the tread 60 can be a thermo-set material. The tread 60 can be molded onto, injected, fused, welded, or otherwise joined with the frame 20. In some cases, the tread 60 is formed separately from the frame 20 and then coupled with the frame 20. In other cases, the tread 60 is formed with the frame 20. For example, the frame 20 can be molded during substantially the same operation (e.g., injection molding operation) as the tread 60. In certain instances, the tread 60 covers all exposed outside surfaces of the frame 20. In some embodiments, the tread 60 is injection molded onto the frame 20. In certain cases, the tread 60 is secured with/to the frame 20 by adhering with the indentation features 23.

In some implementations, the tread 60 engages with recesses 26 on the frame 20. For example, the tread 60 can extend around a portion of the sidewall of the frame 20, such that the tread 60 is located radially outward of the frame 20 and a portion of the tread 60 is engaged with the recess 26. In certain variants, the tread 60 wraps around a portion of the frame 20. In certain instances, the tread 60 is joined with the frame 20 with an adhesive (e.g., glue or epoxy), thermal or sonic welding, or otherwise. For example, an adhesive can be applied to an outer surface of the frame 20 and/or an inner surface of the tread 60. In some embodiments, the outer surface (e.g., tread-engaging surface) of the frame 20 and/or an inner surface (e.g., structure-engaging surface) of the tread 60 can be textured (e.g., dimpled, ribbed, grooved, or otherwise), which can facilitate a connection between the frame 20 and the tread 60.

The tread 60 can include a traction surface 62 configured to engage with a floor or other surface when the non-motorized vehicle (e.g., a shopping cart) is moved. The traction surface 62 can be constructed of the same material as the tread 60 or from a difference material. In some embodiments, the traction surface 62 includes friction features (e.g., channels, protrusions, etc.) configured to facilitate grip between the traction surface 62 and the floor on which it is resting.

With regard to FIGS. 6-9, an embodiment of a housing assembly 70 is illustrated. As shown, the housing assembly 70 can include a structural hub 80 and a cover 90. In certain embodiments, the hub 80 and the cover 90 can be assembled together. For example, the hub 80 and cover 90 can be held together by fasteners 50, which can be arranged in a radial pattern around the circumference of the hub 80 and/or cover 90. In some embodiments, the fasteners 50 engage with radially outwardly-extending flanges 84, 94 on the hub 80 and cover 90 respectively. For example, one or more flanges 94 on the cover 90 can be aligned with one or more flanges 84 on the hub 80 such that a fastener 50 can be extended through apertures in the aligned flanges 84, 94. In some embodiments, the flanges 94 on the cover 90 are symmetrically distributed about the outer circumference of the cover 90. In some such embodiments, the cover 90 can be attached to the hub 80 in a plurality of relative rotational orientations. In some embodiments, the flanges 94 are asymmetrically distributed about the outer circumference of the cover 90 such that the cover 90 connects with the hub 80 in only one relative rotational orientation. In some such embodiments, rotational alignment of some portion of the hub 80 and/or the contents therein can be consistently aligned with some portion of the cover 90. In some embodiments, the hub 80 and/or cover 90 can include one or more magnets housed within and/or on the surface of the hub 80 and/or cover 90 (e.g., magnets for use with Hall effect sensors to activate the electrical components within or around the housing assembly 70).

In some instances, the hub 80 and/or the cover 90 include second mating features 82. The second mating features 82 can correspond to the features 22 on the inside of the frame 20 of the tread assembly 10. The illustrated embodiment includes a plurality of second mating features 82 arranged in a radial pattern around the outer circumference of the housing assembly 70. Other configurations are also contemplated and are part of this disclosure. In some instances, the second mating features 82 include radially outwardly extending flanges 84.

In some instances, the second mating features 82 include radially inwardly extending notches 85. In some instances, such as in the illustrated embodiment, the second mating features 82 include a combination of radially outwardly extending flanges 84 and radially inwardly extending notches 85.

As shown, the housing assembly 70 can have an axial depth D. In some cases, the second mating features 82 extend less than the entire axial depth D of the housing assembly 70. In other cases, the second mating features 82 can extend less than the entire axial depth D of the housing assembly 70. Such a configuration can, for example, provide an improved connection between the housing assembly 70 and the tread assembly 10 when assembled together, as is discussed below. In some implementations, the depth D of the housing 70 is greater than or equal to the axial width W of the frame 20.

In some embodiments, the cover 90 and the hub 80 include rib features 97 and 87 that form a mating channel structure around the inside circumference of the cover 90 and the hub 80. The rib features 97 and 87 can house a seal (e.g., a rubber or polymeric O-ring), which can be configured to inhibit or prevent moisture or other contaminants from entering the inside of the housing assembly 70 when the hub 80 is assembled with the cover 90. Such a configuration can, for example, protect devices (e.g., mechanical or electrical components) disposed inside the housing assembly 70. Examples of such devices can include, for example, a brake mechanism, a two-way communication device, a navigation device, a power generator, a computer processor, a battery, combinations of such devices, or otherwise. Examples of some such devices are discussed in the following: U.S. Pat. No. 8,046,160, titled "NAVIGATION SYSTEMS AND METHODS FOR WHEELED OBJECTS"; U.S. Patent Application Publication No. 2006/0244588, filed Mar. 20, 2006, titled "TWO-WAY COMMUNICATION SYSTEM FOR TRACKING LOCATIONS AND STATUSES OF WHEELED VEHICLES"; and U.S. Patent Application Publication No. 2006/0249320, filed Mar. 20, 2006, titled "POWER GENERATION SYSTEMS AND METHODS FOR WHEELED OBJECTS;" the entirety of each of which is hereby incorporated by reference herein for all it discloses.

In certain variants, the cover 90 and the hub 80 are configured to be readily separable from each other. For example, in some implementations, the cover 90 and the hub 80 are configured to be separable after the fasteners 50 are removed. Designs including a separable cover 90 and hub 80 can, for example, facilitate the ability to service, replace, repair, and/or otherwise attend-to the devices in the housing assembly 70. For example, such designs can facilitate installing a new battery in the housing assembly 70. Some embodiments have an O-ring or other type of sealing device disposed between, near, or adjacent to the rib features 97 and 87.

In some variants, the cover 90 and the hub 80 are substantially permanently joined. For example, in some embodiments, the channel structure can be at least partly filled with an adhesive (not shown) that, in combination with the surfaces formed by rib features 97 and 87, substantially permanently joins the cover 90 and the hub 80. In some embodiments, the adhesive forms a portion of the seal between the cover 90 and the hub 80. Further, in some such embodiments, the adhesive can inhibit or otherwise discourage disassembly of the housing assembly 70.

Certain embodiments that have substantially permanently joined cover 90 and hub 80 have a longer life expectancy than embodiments in which the cover 90 and the hub 80 are readily separable. For example, embodiments in which the cover 90 and the hub 80 are substantially permanently joined can include a battery having a greater life expectancy, an internal generator and power storage (such as is described in U.S. Patent Application Publication No. 2006/0249320, incorporated by reference herein), and/or intelligent power management circuits utilizing motion sensors, each of which, alone or in combination, can provide a longer life than embodiments in which the cover 90 and the hub 80 are readily separable.

Figure 9:
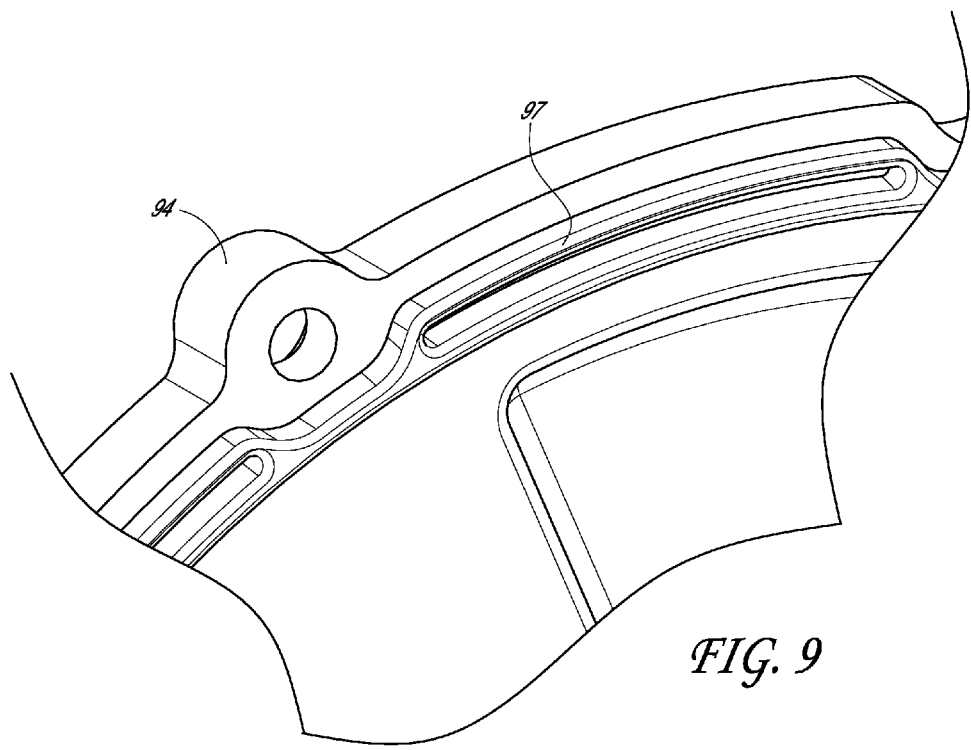
FIG. 9 illustrates a close-up view of a portion of an embodiment of the cover of FIG. 6.
Figure 10:
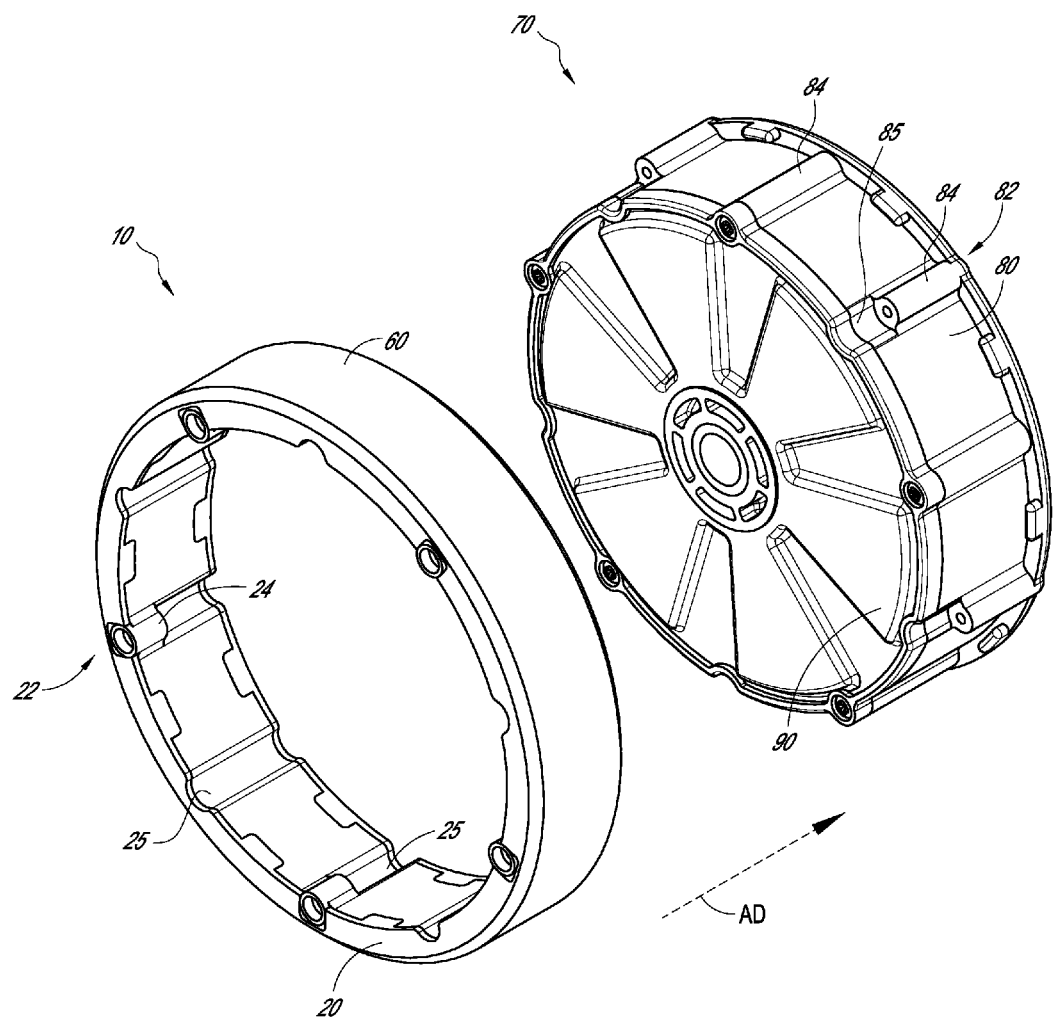
FIG. 10 illustrates an exploded view of an embodiment of the wheel assembly of FIG. 1, including the tread assembly of FIG. 2 and the housing assembly of FIG. 6.
Figure 11:
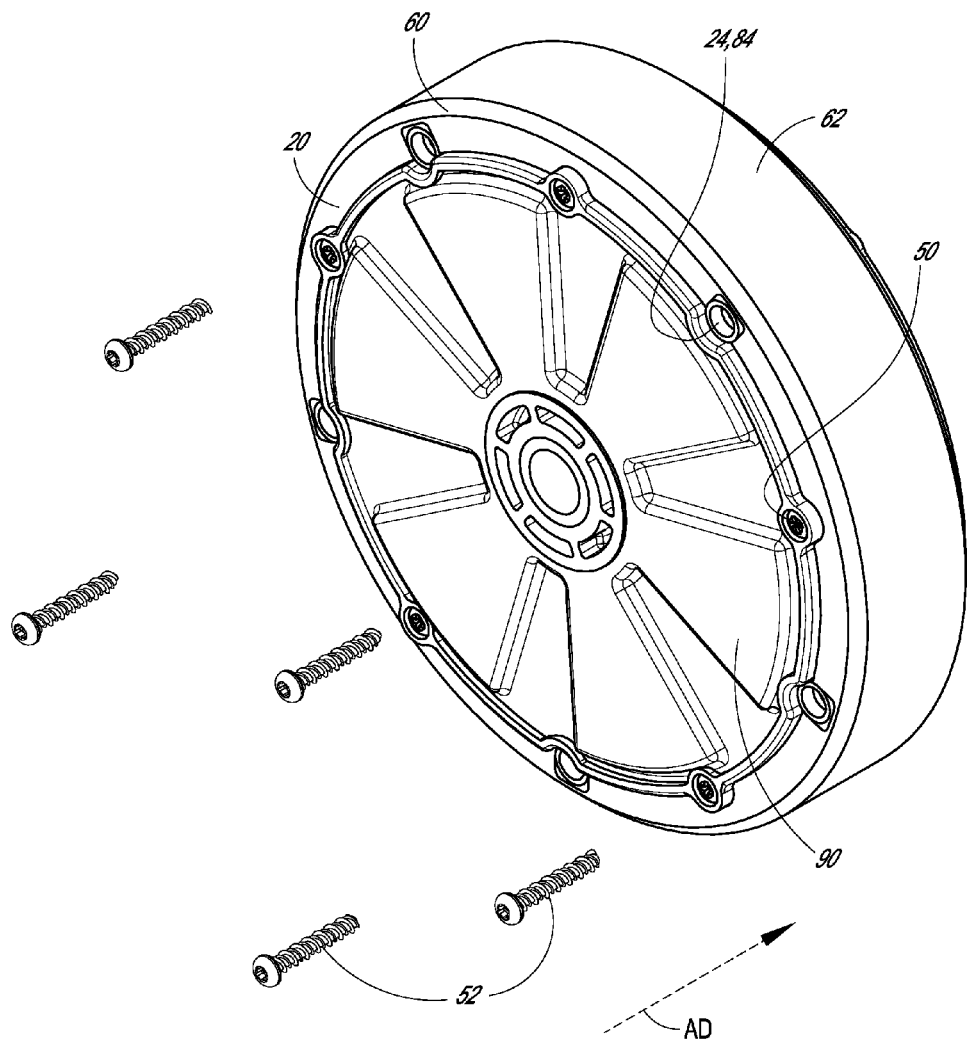
FIG. 11 illustrates the wheel assembly of FIG. 10 in a partially assembled state, with the tread assembly coupled with the housing assembly, and a plurality of fasteners in an exploded view.

As shown in the exploded views of FIGS. 9-11, the tread assembly 10 can be installed on the housing assembly 70. For example, the first mating features 22 of the frame 20 can be aligned with the second mating features 82 of the cover 80 and hub 90 of the housing assembly 70. In certain embodiments, the tread assembly 10 can be axially slidably mounted on the housing assembly 70 when the tread assembly 10 and housing assembly 70 are moved toward one another in an axial direction AD. In certain such embodiments, the first mating features 22 can be received in the radially inwardly extending notches 85 of the housing assembly 70, thus providing a circumferential interference, which can inhibit or prevent the tread assembly 10 from rotating relative to the housing assembly 70. In some embodiments, the flanges 84 are received into the indentations 25 of the frame 20 to provide additional or alternative circumferential interference between the housing assembly 70 and the tread assembly 10. The first mating features 22 and second mating features 82 can be circumferentially distributed in a symmetric pattern such that the tread assembly 10 can align with the housing assembly 70 in a plurality of relative rotational orientations. In some embodiments, the first mating features 22 and second mating features 82 are asymmetrically circumferentially distributed such that the tread assembly 10 and housing assembly 70 can align in only one relative rotational orientation. In some such embodiments, alignment between certain features (e.g., sensors, mechanical components, electrical components, etc.) within the housing assembly 70 and certain features of the tread assembly 10 can be facilitated.

Figure 2A:
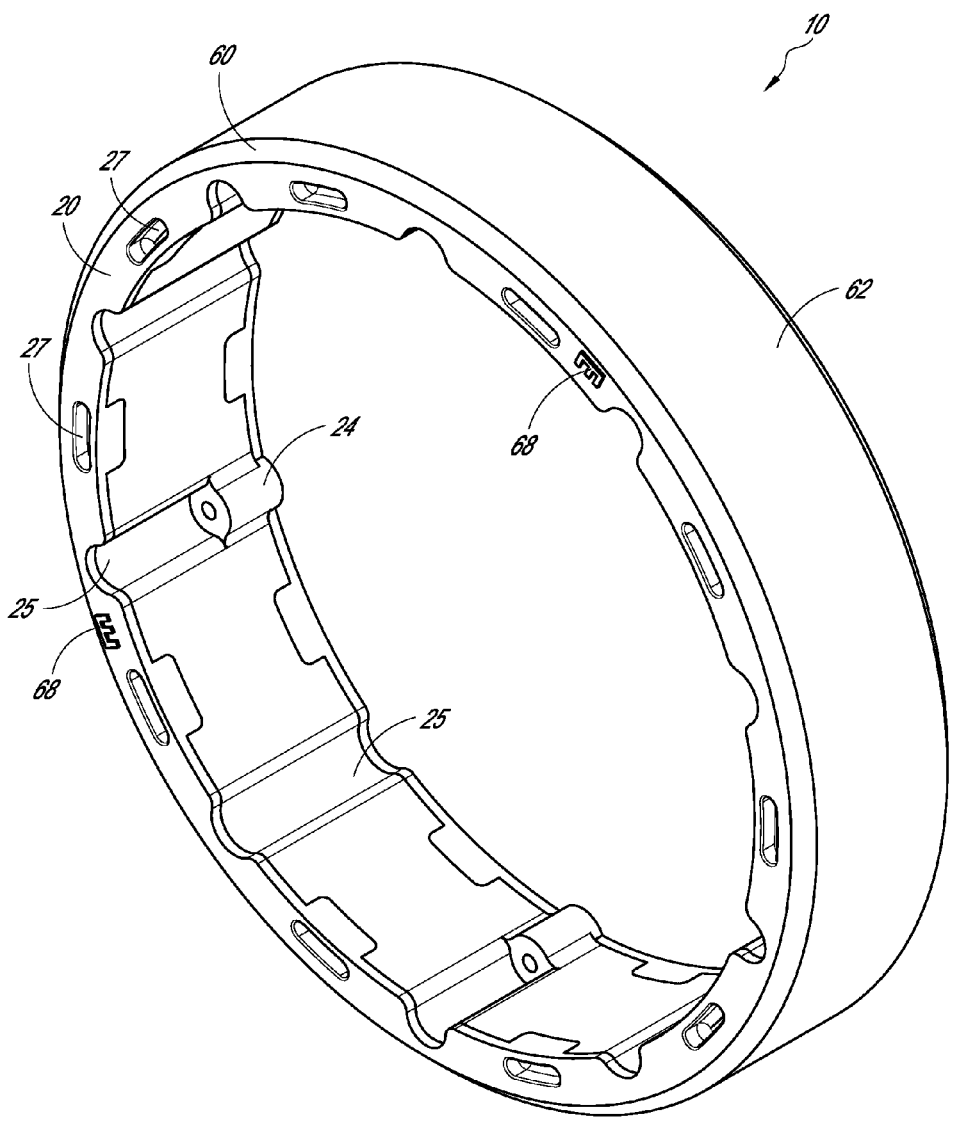
FIG. 2A illustrates a rear perspective view of the tread assembly of FIG. 1.

In some embodiments, as illustrated in FIG. 2A, the tread 60 and/or frame 20 can include one or more mating identifiers 68. The mating identifiers 68 can facilitate proper orientation of the tread assembly 10 with respect to the housing assembly 70 for connecting the tread assembly 10 to the housing assembly 70. For example, mating identifiers 68 can be located on the side of the tread 60 that faces the housing assembly 70 before the tread assembly 10 is received onto the housing assembly 70. In some embodiments, the mating identifiers 68 correspond to the side of the tread assembly 10 opposite the inwardly-extending flanges 24.

In some embodiments, the tread assembly 10 is secured with the housing assembly 70 with fasteners 52 in order to, for example, reduce the chance of unintentional separation and/or to reduce vibration. In some configurations, the housing assembly 70 and/or the tread assembly 10 include indicia to indicate the fasteners 52 that couple the housing assembly 70 with the tread assembly 10. In certain instances, at least one of the fasteners 52 is configured to discourage tampering with the wheel assembly. For example, at least one of the fasteners 52 can have a non-standard screw driving connection (e.g., a tamper-resistant head). The fasteners 52 can be installed into the tread assembly 10 and housing assembly along the axial direction AD.

In some embodiments, a method of installing a tread assembly 10 includes sliding the tread assembly 10 onto the housing assembly 70. In certain instances, the tread assembly 10 is slid until it is generally fully seated on the housing assembly 70 (e.g., in contact with a positive stop or other feature to denote proper placement). The hub 80 can include one or more hub orientation features 83, such as one or more protrusions 83 or recesses. In some such embodiments, the tread 60 and/or frame 20 can include one or more tread orientation features 27 (e.g., protrusions and/or recesses) configured to engage with the one or more hub orientation features 83. Engagement between the tread orientation features 27 and the hub orientation feature 83 can facilitate alignment between the first mating feature 22 and the second mating feature 82. In some cases, the tread assembly 10 is axially installed (e.g., by sliding) onto the housing assembly 70. In some embodiments, the method includes securing the tread assembly 10 to corresponding features on the hub 80 with fasteners 52. According to some variants, the tread assembly 10 can be connected with and disconnected from the housing assembly 70 without unsealing the housing assembly 70 (e.g., without removing the cover 90 from the hub 80).

Figure 12:
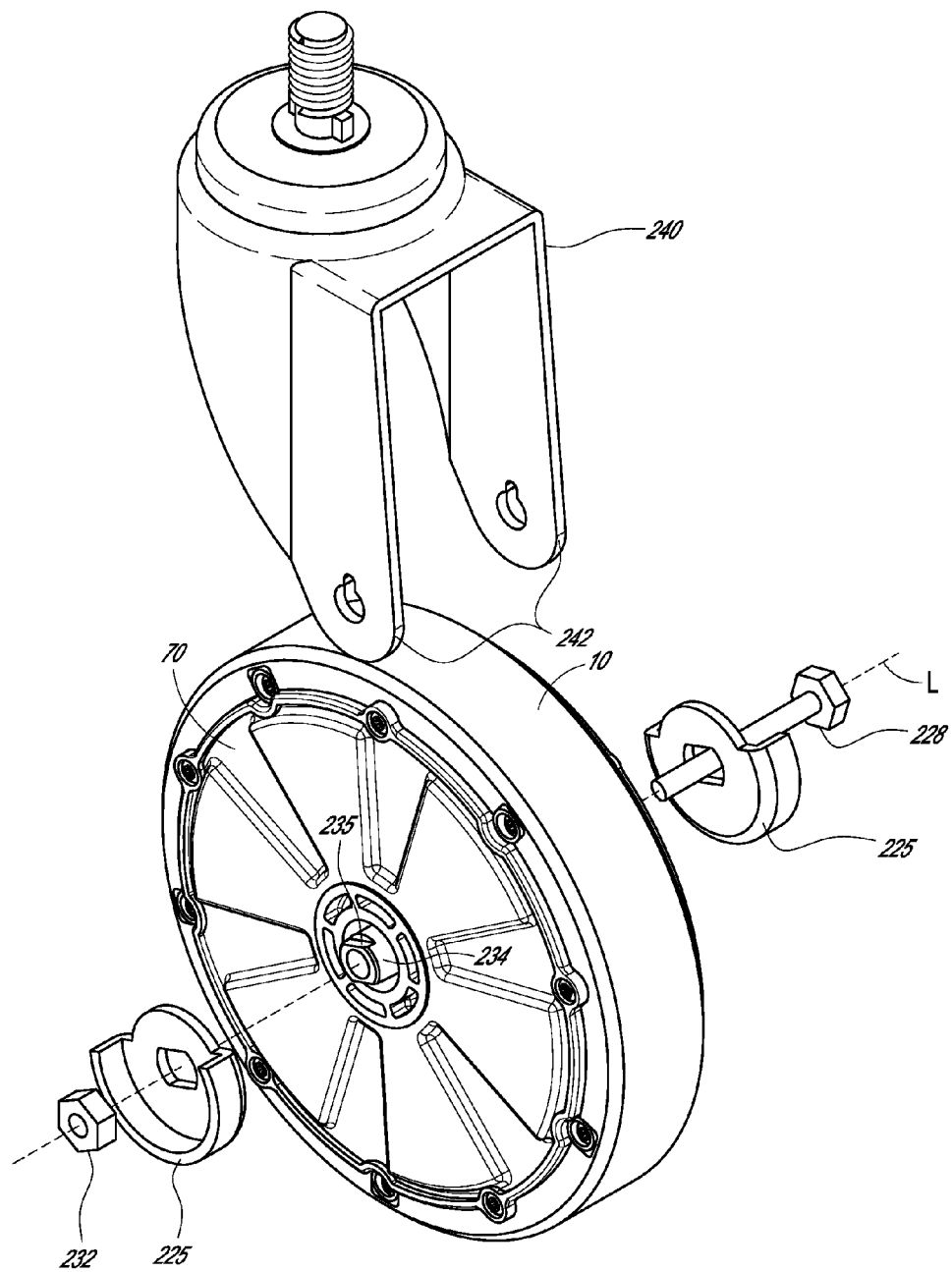
FIG. 12 illustrates the wheel assembly of FIG. 11 in an assembled state, with a caster and associated hardware shown in an exploded view.
Figure 13:
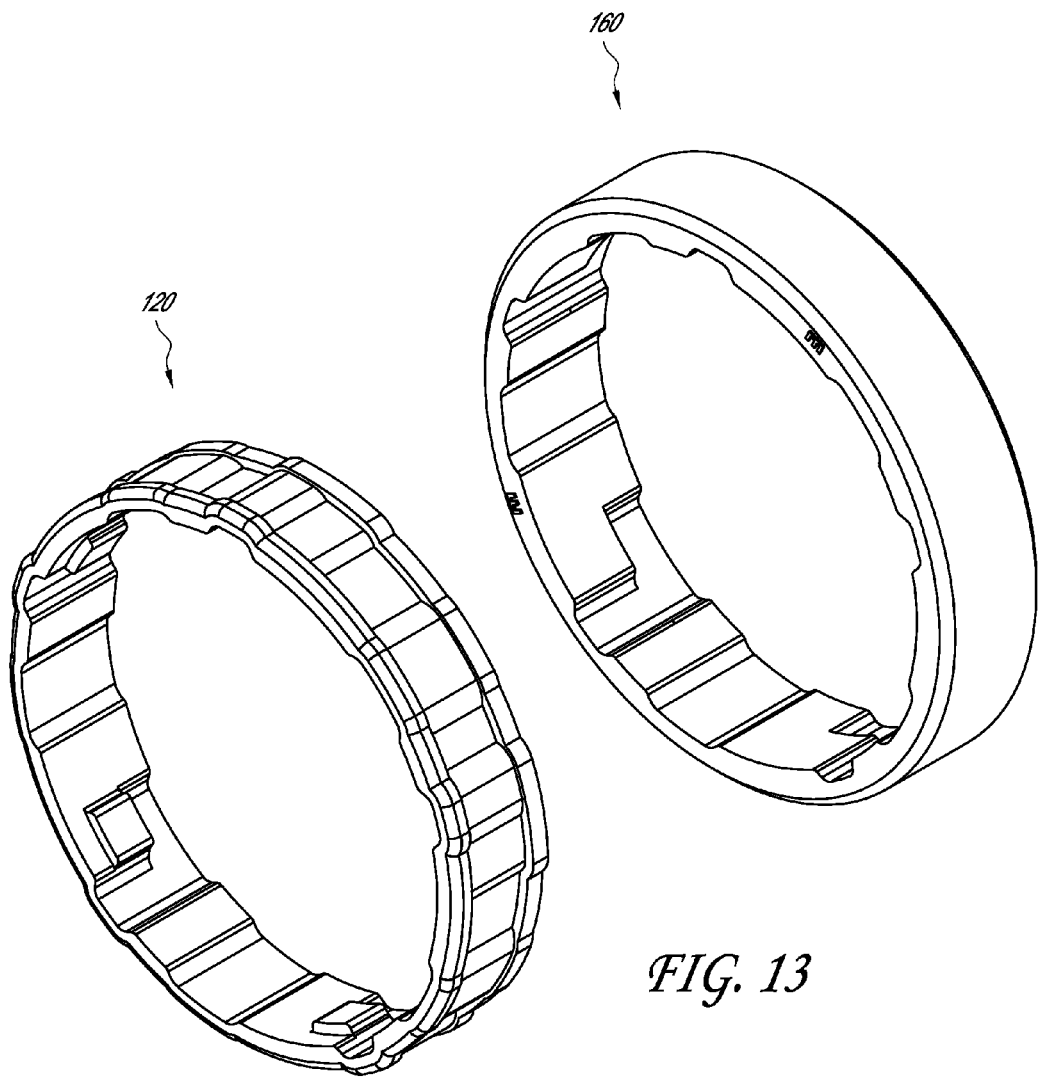
FIG. 13 illustrates an exploded view of another embodiment of a tread assembly, including a frame and a tread.

In certain embodiments, the method further includes mounting the wheel assembly with a caster 240, for example as shown in FIG. 12. In certain embodiments, the method also includes placing the wheel assembly between end portions 242 of the caster 240; placing a first fastener 228 (e.g., a bolt) through the end portions 242 and the wheel assembly; and securing the first fastener 228 with a second fastener 232 (e.g., a nut). In certain instances, the method also includes mating at least one flat portion 235 of an axle 234 of the wheel assembly with a retaining clip 225. In certain such cases, the method also includes inhibiting rotation of the axle 234. For example, rotation of the axle 234 can be inhibited by an interference fit between the "U"-shaped side of the retaining clip 225 and at least one of the end portions 242 of the caster 240.

In some embodiments, a method of removing a tread assembly 10 includes substantially the reverse of some of the actions in the above-described method of installing a tread assembly 10. For example: separating the wheel assembly from the caster 240 (e.g., by loosening fastener 228, 232 and removing the fastener 228), loosening the fasteners 52, and axially sliding the tread assembly 10 off of the housing assembly 70.

In some embodiments, a method of manufacturing a tread assembly 10 includes forming a frame 20 and molding a tread 60 onto the frame 20. Some embodiments include vulcanizing the tread 60. In some cases, the method includes applying an adhesive to an outer surface of the frame 20, which can, for example, improve adherence of the tread 60 with the frame 20.

Figure 14:
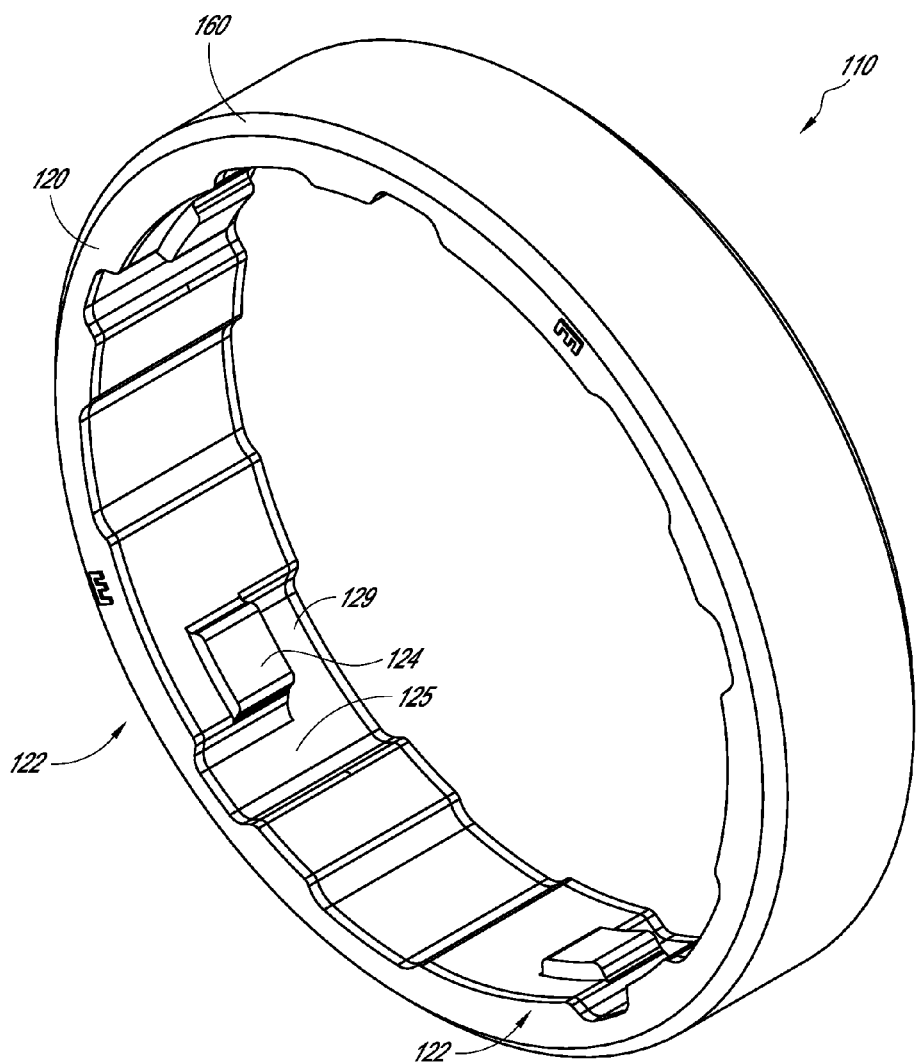
FIG. 14 illustrates the tread assembly of FIG. 13 in an assembled state.

With regard to FIGS. 13-22, another embodiment of a tread assembly is illustrated. In some embodiments, the tread assembly 110 includes a frame 120 and a tread 160. Certain embodiments of the frame 120 are nylon and are injection molded. In some embodiments, the tread 160 is rubber (e.g., ethylene propylene diene monomer (EPDM)). Certain variants of the tread 160 can be over-molded onto the insert ring 120. As shown in FIG. 14, in the assembled tread 110, the tread 160 can be positioned generally outside and around the frame 120. For example, the frame 120 can be received in the tread 160.

Figure 15:
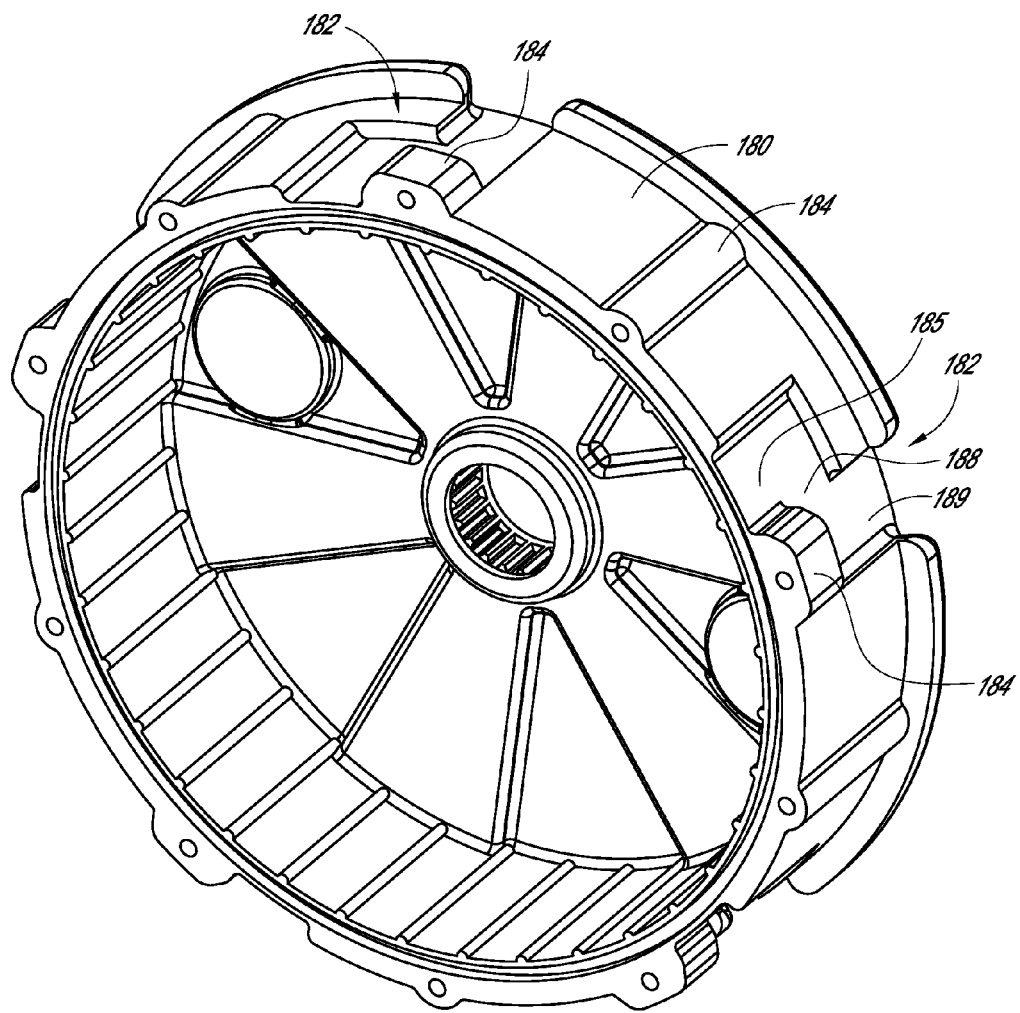
FIG. 15 illustrates an embodiment of a wheel hub assembly.
Figure 16:
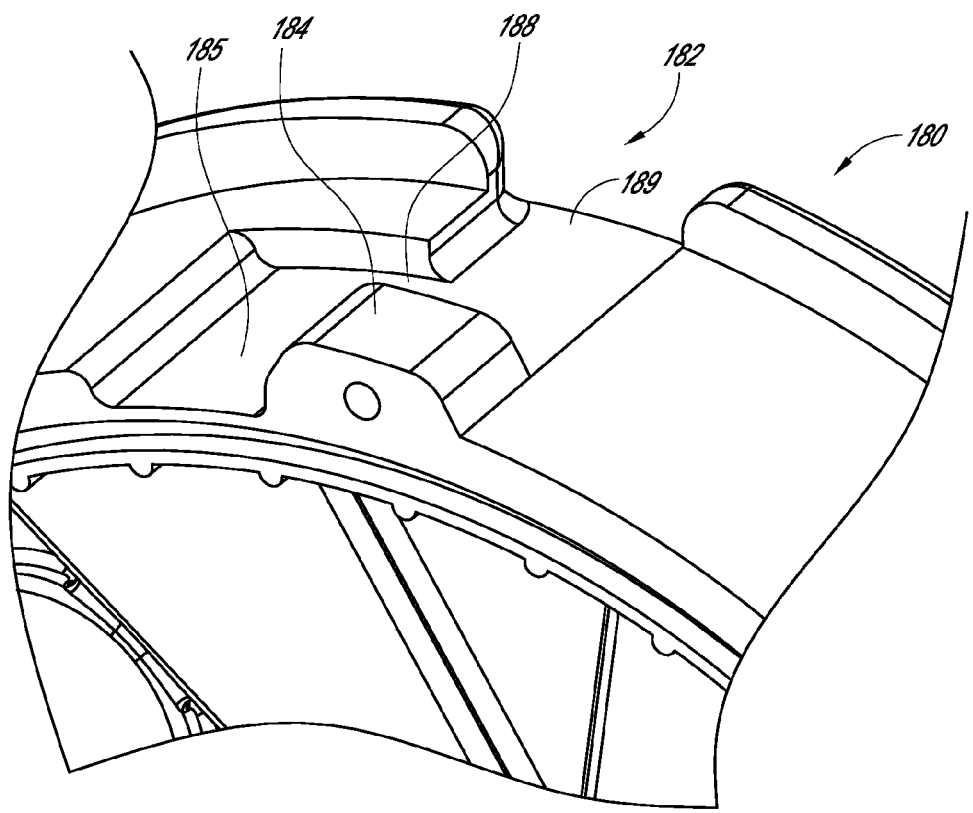
FIG. 16 illustrates a close-up view of the hub assembly of FIG. 15.

As illustrated in FIGS. 14-16, in certain implementations, the tread insert component 120 has first mating features 122 arranged in a radial pattern and spaced apart from one another in a circumferential direction $D_C$ around an inside circumference of the frame 120. In some variants, the first mating features 122 correspond to second mating features 182 located on an outer circumference of a wheel hub 180. The second mating features 182 can be arranged in a radial pattern around the circumference of the hub 180. The tread assembly illustrated in FIGS. 13-22 includes a wheel cover configured to mate with the hub 180 that is not shown in the figures. The wheel cover can be configured to mate with the hub 180 to create a seal between the wheel cover and the hub 180. In some embodiments, the first mating features 122 and second mating features 182 are asymmetrically circumferentially distributed such that the tread insert component 120 and hub 180 can align in only one relative rotational orientation. In some such embodiments, alignment between certain features (e.g., sensors, mechanical components, electrical components, etc.) of the hub 180 and certain features of the frame 120 and/or tread 160 can be facilitated. The first mating features 122 and second mating features 182 can, in some embodiments, be circumferentially distributed in a symmetric pattern such that the insert component 120 can align with the hub 180 in a plurality of relative rotational orientations.

Figure 17:
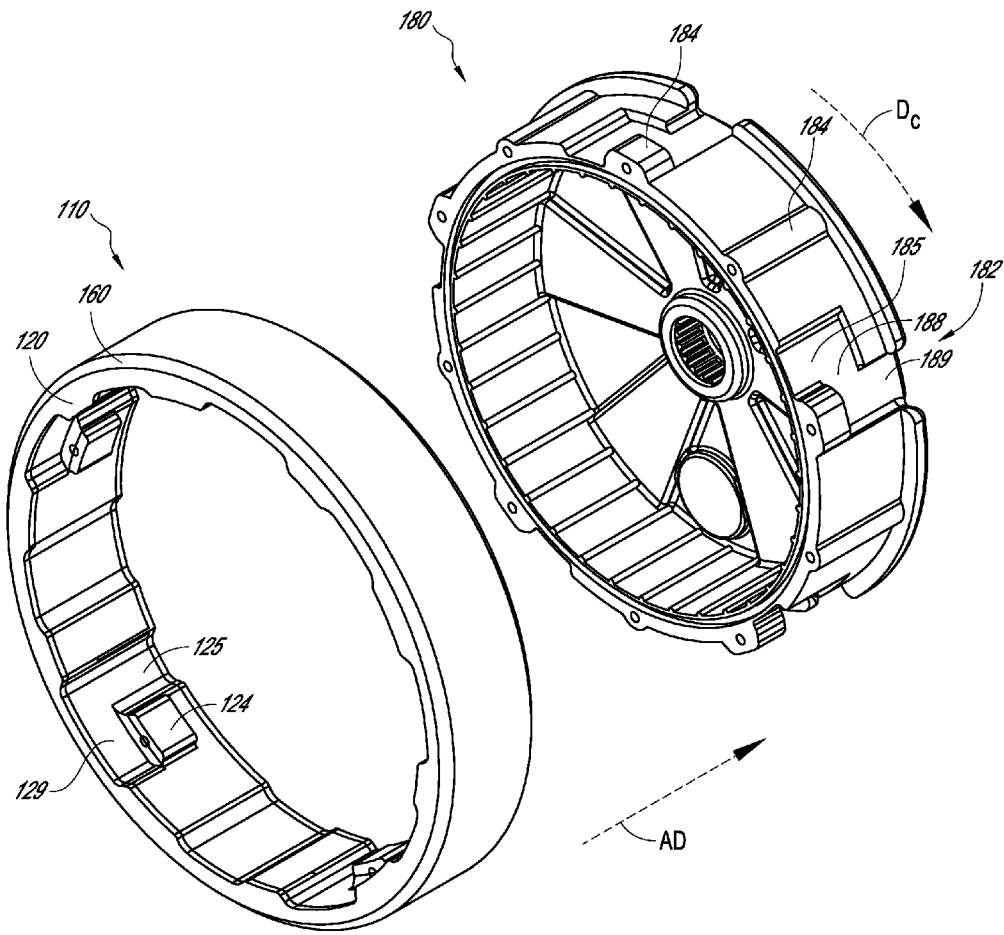
FIG. 17 illustrates an exploded view of the tread assembly of FIG. 14 and the wheel hub assembly of FIG. 16.
Figure 18:
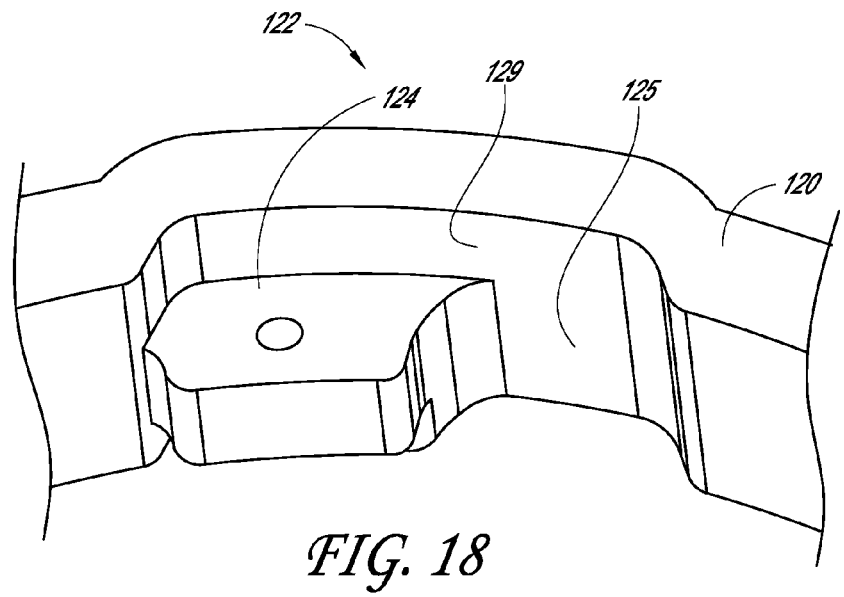
FIG. 18 illustrates a close-up view of protrusions and recesses of the frame of FIG. 13.
Figure 19:
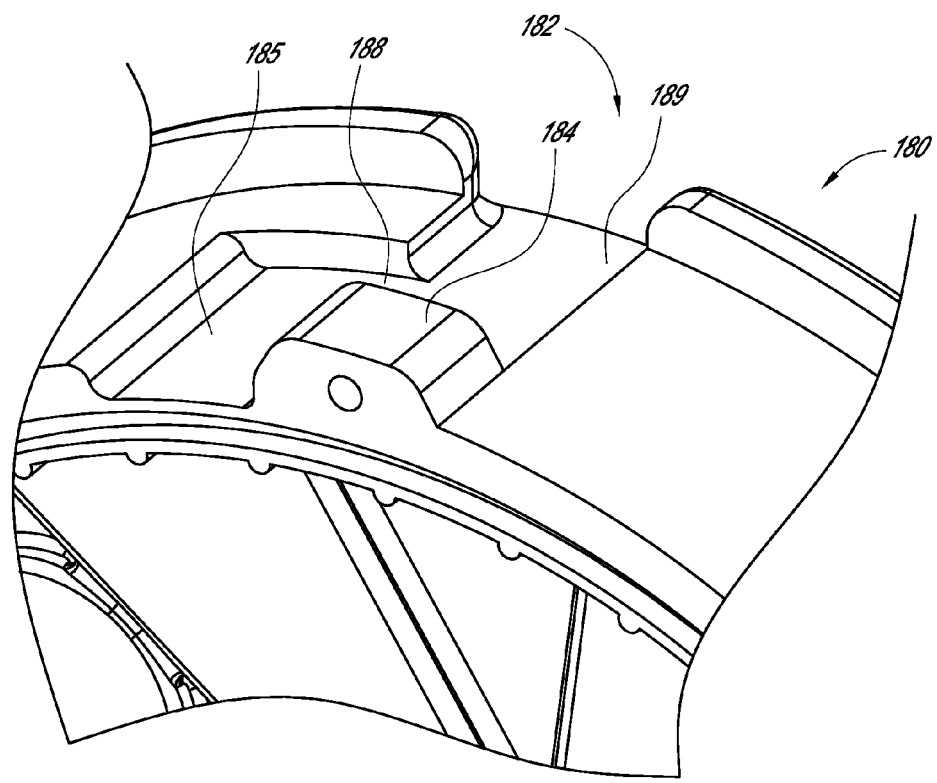
FIG. 19 illustrates a close-up view of protrusions and recesses of the wheel hub of FIG. 15.
Figure 20:
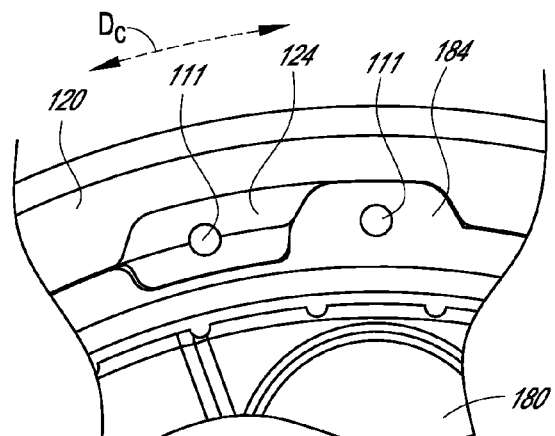
FIG. 20 illustrates a close-up view of one of the protrusions of FIG. 19 and one of the recesses of FIG. 18 in a partially assembled state.

As shown in FIGS. 17 and 18, in some variants, the first mating features 122 of the frame 120 include protrusions 124 and recesses 125. In certain embodiments, the second mating features 182 of the hub 180 include recesses 185 and protrusions 184. The first mating features 122 can be configured and arranged in such a way that the protrusions 124 can be received in the recesses 185 on the hub 180, thereby allowing the mating engagement of the protrusions 124 and the recesses 185. Similarly, the protrusions 184 on the hub 180 can be received in the recesses 125 on the insert ring 120, thereby allowing the mating engagement of the protrusions 184 and the recesses 125.

In certain embodiments, the tread insert 160 can be assembled with the wheel hub 180 by mating (e.g., by sliding) the tread insert 160 onto the hub 180. For example, the protrusion 124 on the insert 160 can be generally aligned with a portion of the recess 185 of the hub 180, thereby allowing the protrusion 124 to be slidably received (e.g., axially) in the recess 185. In some embodiments, the insert 160 is pushed onto the hub 180. In some embodiments, the tread insert 160 is pushed completely onto the hub.

In certain variants, the recess 185 has sufficient axial width (e.g., parallel with the axis of rotation) that the protrusion 124 does not circumferentially interfere with the protrusion 184, when the protrusion 124 is received in the recess 185. In some arrangements, when the protrusion 124 is received in the recess 185, the protrusion 124 has a first axial width and the protrusion 184 has a second axial width, with the first and second axial widths not axially overlapping.

Figure 21:
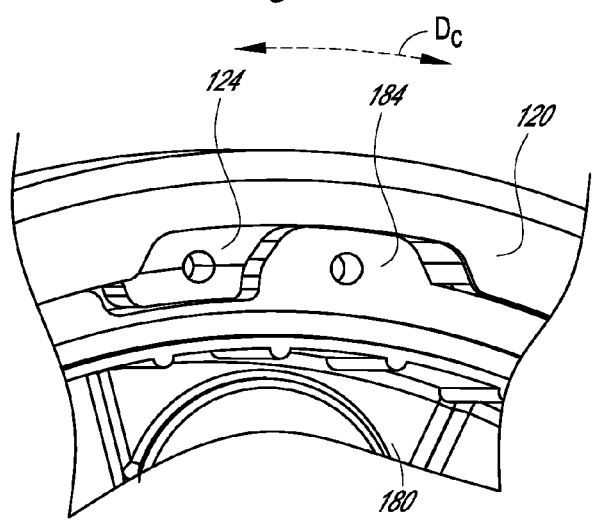
FIG. 21 illustrates a close-up view of the protrusion and recesses of FIG. 20 in another partially assembled state.
Figure 22:
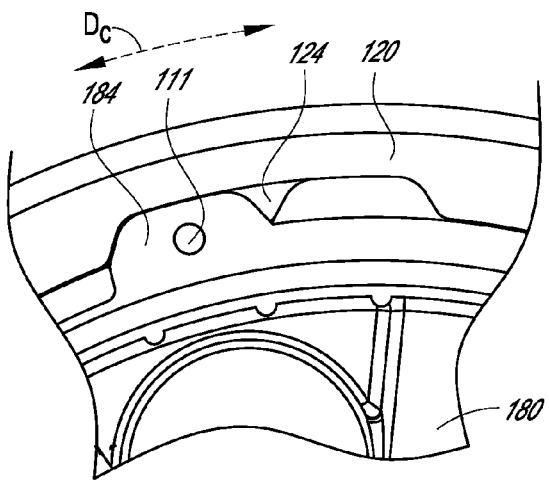
FIG. 22 illustrates a close-up view of the protrusion and recesses of FIG. 20 in an assembled state.

As shown in FIGS. 21 and 22, in some implementations, the tread insert 160 can be rotated relative to the hub 180. In some embodiments, the tread insert 160 can be rotated (e.g., in a clockwise direction relative to the hub) until it engages (e.g., abuts or otherwise is stopped by) walls that define the recess 185 of the hub 180. For example, rotation of the tread insert 160 relative to the hub 180 can cause the protrusion 124 of the insert 160 to be received into a second recess 188 extending perpendicular and generally in a circumferential direction $D_C$ away from the recess 185. In some configurations, rotation of the tread insert 160 relative to the hub 180 can cause the protrusion 184 of the hub 80 to be received into the second recess 129 on the tread insert 120. Such a configuration can, for example, increase the strength and/or reduce the likelihood of relative movement of the insert 160 and hub 180. In some embodiments, the engagement of the insert 160 and the walls of the hub 180 facilitates torque transfer between the insert 160 and the hub 180. In certain variants, when the tread insert 160 is rotated, the protrusions 124 on the inside circumference are moved near, next to, in front of, and/or behind the protrusions 184 on the outside of the hub 180.

In certain implementations, the protrusions 124, 184 include holes 111. In certain embodiments, when the tread insert component 160 has been rotated to its final position, the holes 111 that pass through each of the protrusions 124, 184 will be aligned. In some implementations, fasteners (e.g., screws 52) can be driven into the aligned holes 111, thereby securing the tread insert 160 and hub 180 and/or inhibiting or preventing further relative rotation of the insert 160 and hub 180. Some variants include a wheel cover with a mating hole (not shown). In some embodiments, the fasteners 50, 52 secure the tread insert 160 and hub 180 and wheel cover (not shown). For example, the fasteners 50, 52 can pass through a portion of each of the tread insert 160 and hub 180 and wheel cover. Such a configuration can enhance the structural and/or watertight characteristics of the tread assembly. In some embodiments, each of the fasteners 50, 52 passes through the wheel cover. In some embodiments, the fasteners 52 used to connect the first mating feature 122 to the second mating feature 182 can have a non-standard screw driving connection (e.g., a tamper-resistant head).

In some embodiments, the tread insert 160 can be configured such that the protrusion 124 can be axially spaced apart from the protrusion 184. In some variations, the protrusion 124 of the tread insert 106 are received by a generally axially oriented third recess 189 of the second mating feature 182. Such reception of the protrusions 124 can facilitate torque transfer between the protrusion 124 and the walls defining the third recess 189. In some embodiments, engagement of the protrusion 124 with the third recess 189 can reduce stress on any fasteners 52 used to mate the first mating feature 122 with the second mating feature 182.

Although the present disclosure has been described in terms of certain preferred embodiments and certain preferred uses, other embodiments and other uses that are apparent to those of ordinary skill in the art, including embodiments and uses which do not provide all of the features and advantages set forth herein, are also within the scope of the present disclosure. Components, elements, features, acts, or steps can be arranged or performed differently than described and components, elements, features, acts, or steps can be combined, merged, added, or left out in various embodiments. For example, any or all of the features of the tread assembly of FIGS. 1-12 can be used with the tread assembly of FIGS. 13-22, and any or all of the features of the tread assembly of FIGS. 13-22 can be used with the tread assembly of FIGS. 1-12. Also, the wheels and tread assemblies shown and described herein can be used on any type of non-motorized wheeled vehicle, human-propelled vehicle, or cart such as a shopping cart, a hospital or medical device cart, wheelchair, an equipment cart, and so forth. Indeed, all possible combinations and subcombinations of elements and components described herein are intended to be included in this disclosure. No single feature or group of features is necessary or indispensable for every embodiment. Accordingly, the scope of certain embodiments of the present disclosure is to be defined by the claims that follow and their obvious modifications and equivalents.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

Similarly, while operations may be depicted in the drawings or described in the specification in a particular order, it is to be recognized that such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Additionally, the operations may be rearranged or reordered in other implementations. Moreover, the separation of various system components in the implementations described above should not be understood as requiring such separation in all implementations, and it should be understood that the described components and systems can generally be integrated together in a single product or packaged into multiple products. Additionally, other implementations are within the scope of the following claims. In some cases, the actions recited in the claims can be performed in a different order and still achieve desirable results.

The following is claimed:

1. A wheel for a human-propelled cart, the wheel comprising:
a housing assembly comprising a hub and a cover,
the hub having an inner cavity and comprising a frame engaging surface
having a second mating feature, the inner cavity configured to receive an electrical component,
the cover configured to be sealed with the hub, thereby inhibiting access into the inner cavity;
a tread assembly configured to axially receive a portion of the housing assembly, the tread assembly comprising a frame and a tread,
the frame comprising a tread engaging surface and a hub engaging surface, the hub engaging surface having a first mating feature and being configured to releasably couple with the frame engaging surface of the hub,
the tread disposed radially outward of the frame, the tread configured to engage a surface on which the wheel is configured to roll; and
a fastener configured to engage the second mating feature of the frame engaging surface and the first mating feature of the hub engaging surface;
wherein the tread assembly is configured to removably couple with the housing assembly such that the tread assembly can be axially separated from the housing assembly without unsealing the cover and the hub, thereby facilitating repair or replacement of the tread assembly while maintaining the seal of the cover and the hub, and
wherein, when the hub engaging surface of the frame is coupled with the frame engaging surface of the hub, the first mating feature and the second mating feature are circumferentially aligned such that the fastener can axially engage the first mating feature and the second mating feature.

2. The wheel of claim 1, wherein the second mating feature comprises a radially outwardly-extending flange.

3. The wheel of claim 2, wherein the tread assembly further includes a frame alignment feature comprising a first tread recess configured to receive the second mating feature.

4. The wheel of claim 3, wherein the housing assembly further includes a hub alignment feature comprising a first housing recess configured to receive the first mating feature.

5. The wheel of claim 4, wherein the wheel is configured to rotate around a rotation axis, and the hub is configured to be rotated relative to the frame about the rotation axis of the wheel.

6. The wheel of claim 5, wherein the hub alignment feature includes a second housing recess perpendicular to and extending tangentially from the first housing recess, the second housing recess configured to receive the first mating feature when the hub is rotated relative to the frame.

7. The wheel of claim 6, wherein the hub alignment feature includes a third housing recess extending in a direction axially away from the second mating feature, the third housing recess configured to receive the first mating feature when the hub is rotated relative to the frame such that the first mating feature is aligned with the third housing recess.

8. The wheel of claim 5, wherein the frame alignment feature includes a second tread recess oriented perpendicular to and extending circumferentially from the first tread recess, the second tread recess being configured to receive the second mating feature when the hub is rotated relative to the frame.

9. The wheel of claim 8, wherein the frame alignment feature includes a third tread recess extending in a direction axially away from the first mating feature, the third tread recess configured to receive the second mating feature when the hub is rotated relative to the frame such that the second mating feature is aligned with the third tread recess.

10. The wheel of claim 1, wherein the tread assembly comprises a first rotational axis and the housing assembly comprises a second rotational axis, the first rotational axis and the second rotational axis being collinear when the housing assembly and tread assembly are coupled.

11. The wheel of claim 1, wherein:
the tread has a tread width;
the first mating feature and the second mating feature each have an axial width that is less than the tread width; and
wherein the sum of the axial widths of the first mating feature and the second mating feature is about equal to the tread width.

12. The wheel of claim 1, wherein the human-propelled cart is a shopping cart.

13. The wheel of claim 1, wherein the second mating feature comprises a radially-outward extending flange having a generally cylindrical shape.

14. The wheel of claim 1, wherein:
the second mating feature comprises a radially-outward extending flange; and
the first mating feature comprises an indentation with a shape corresponding to the shape of the flange and configured to receive the flange.

15. The wheel of claim 1, wherein the first mating feature and the second mating feature are configured to engage such that rotation of the tread relative to the hub is inhibited.

16. The wheel of claim 1, wherein:
the fastener is further configured to axially engage the first mating feature and the second mating feature from a first side of the wheel; and
the cover is further configured to be secured to the hub with a second fastener, the second fastener being configured to axially engage the cover from the first side of the wheel.

17. A method of assembling a shopping cart wheel, the method comprising:
forming a housing assembly, wherein forming the housing assembly comprises:
providing a hub having a central cavity, the hub comprising a second mating feature; and
axially joining a cover with the hub, the cover configured to form a seal between the cover and the hub, thereby inhibiting access by contaminants into the cavity;
forming a tread assembly, wherein forming the tread assembly comprises:
providing an annular frame comprising an inner surface and outer surface, the inner surface and the outer surface each comprising recesses, the inner surface further comprising a first mating feature;
disposing a tread around at least the outer surface of the frame; and
engaging the tread with the recesses on the inner surface and the outer surface of the frame, thereby securing the tread with the frame;
aligning the second mating feature of the hub with the first mating feature of the frame;
receiving the housing assembly into the tread assembly; and
securing the housing assembly with the tread assembly.

18. The method of claim 17, wherein securing the housing assembly with the tread assembly comprises:
positioning the second mating feature in a first recess of the frame, wherein the second mating feature comprises a radially outwardly extending flange;
positioning the first mating feature in a second recess of the hub, wherein the first mating feature comprises a radially inwardly extending flange;
axially inserting a fastener through the second mating feature and the first mating feature.

19. The method of claim 18, further comprising rotating the housing assembly and the tread assembly relative to each other after the housing assembly has been received into the tread assembly.

20. The method of claim 19, further comprising axially spacing the second mating feature apart from the first mating feature.

21. A method of repairing a wheel of a shopping cart, the wheel comprising a housing assembly and a tread assembly coupled with a plurality of fasteners located around an outer circumferential region of the wheel, the housing assembly coupled with the shopping cart via a caster assembly, the housing assembly comprising a central sealed chamber that includes an electrical component, the method comprising:
removing the wheel from the caster assembly;
loosening the fasteners such that the housing assembly and the tread assembly can be separated;
separating the tread axially from the housing assembly without opening the central sealed chamber of the housing assembly;
aligning first flanges of a replacement tread assembly with first recesses of the housing assembly;
aligning second recesses of the replacement tread assembly with second flanges of the housing assembly;
axially sliding the replacement tread assembly onto the housing assembly;
securing the fasteners such that the fasteners couple the replacement tread assembly and the housing assembly; and
coupling the housing with the caster assembly.

22. The method of claim 21, wherein loosening the fasteners comprises rotating the fasteners.

23. The method of claim 21, further comprising rotating the tread assembly relative to the housing assembly after the replacement tread assembly has been axially slid onto the housing assembly.

24. The method of claim 21, further comprising radially engaging the first flanges of a replacement tread assembly with the first recesses of the housing assembly, and radially engaging the second recesses of the replacement tread assembly with the second flanges of the housing assembly, thereby providing areas of radial interference between the housing assembly and the tread assembly.

* * * * *